United States Patent [19]
Beswick et al.

[11] Patent Number: 5,456,766
[45] Date of Patent: Oct. 10, 1995

[54] PROCESS FOR CARBONITRIDING STEEL

[75] Inventors: Johan M. Beswick, Montfoort; Adian M. Kerrigan, Utrecht; Jan T. Slycke, Bilthoven; Terence T. Vollmer, Vianen, all of Netherlands

[73] Assignee: SKF Industrial Trading & Development Company, B.V., Nieuwegein, Netherlands

[21] Appl. No.: 247,315

[22] Filed: May 23, 1994

[30] Foreign Application Priority Data

May 26, 1993 [NL] Netherlands .......................... 9300901

[51] Int. Cl.$^6$ .................................................. C22C 38/12
[52] U.S. Cl. ......................... 148/216; 148/218; 420/123
[58] Field of Search .................................. 148/215, 206, 148/216, 218, 225; 420/123

[56] References Cited

U.S. PATENT DOCUMENTS

| | | | |
|---|---|---|---|
| 4,386,972 | 6/1983 | Knight | 148/218 |
| 4,961,904 | 10/1990 | Beswick | 420/123 |

FOREIGN PATENT DOCUMENTS

| | | |
|---|---|---|
| 2209058 | 4/1989 | United Kingdom . |
| 2235212 | 2/1991 | United Kingdom . |
| 2258274 | 2/1993 | United Kingdom . |

OTHER PUBLICATIONS

6001 Chemical Abstracts, Aug. 23, 1976, vol. 85 No. 4, p. 204.

E. L. Gyulikhandanov, L. M. Semenova, and V. I. Shapochkin, Structure of Carbonitrided Layers Contaiing Increased Concentrations of Nitrogen, Dec. 1990 Plenum Publishing Corporation, pp. 326–330.

E. L. Gyulikhandanov, L. M. Semenova and V. I. Shapochkin, Influence of High–Temperature Carbonitriding on the Structure, Phase Composition, and Properties of Low–Ally Steels, Dec. 1984 Plenum Publishing Corporation, pp. 262–267.

A. V. Pozharskii, S. V. Semenov, I. D. Zaitseva, T. A. Markelova and V. M. Zaikovskii, Increasing the Service Life of Hydraulic Distribution Valves by Thermocycling Carbonitriding of the Slide Valves, Dec. 1984 Plenum Corporation, pp. 273–275.

*Primary Examiner*—Scott Kastler
*Attorney, Agent, or Firm*—Rosen, Dainow & Jacobs

[57] ABSTRACT

Process for carbonitriding a steel comprising:
- 0.75–1.1% by weight of C;
- up to 1.0% by weight of Si;
- less than 0.015% by weight of P;
- up to 0.5% by weight of Mo;
- up to 1.2% by weight of Mn;
- 0.5–2% by weight of Cr,
- the remainder being Fe, by exposing it at elevated temperatures to an atmosphere comprising at least carbon monoxide, hydrogen, nitrogen and added ammonia. This is carried out by exposing it, between 780° and 900° C., for from 1 to 10 hours, to an atmosphere comprising at least carbon monoxide, hydrogen and ammonia with a carbon activity between 0.90 and 1.10 and a nitrogen potential between 0.10 and 0.60% N.

7 Claims, No Drawings

PROCESS FOR CARBONITRIDING STEEL

BACKGROUND OF THE INVENTION

1. Field of the Invention

The present invention relates to a process for carbonitriding a steel comprising:

0.75–1.1% by weight of C;
up to 1.0% by weight of Si;
less than 0.015% by weight of P;
up to 0.5% by weight of Mo;
up to 1.2% by weight of Mn;
0.5–2% by weight of Cr,
the remainder being Fe, by exposing it at elevated temperatures to an atmosphere comprising at least carbon monoxide, hydrogen and ammonia. Such a steel grade is disclosed by U.S. Pat. No. 4961904. Such steel grades are used, for example, for rings and rolling elements of rolling bearings. For general applications, this steel is found to be particularly suitable for roller bearings. It has been found, however, that for certain applications in which a high static load arises, the steel has to be subject to more stringent requirements. Relevant examples include bearings used in gearboxes of vehicles and inalternators.

2. Description of the Prior Art

It has been proposed in the prior art to employ, in order to obtain highly alloyed martensite grades, either a steel grade having a high carbon content or to employ higher hardening temperatures or to apply a combination of these two. This does, however, have the drawback that the structure does not remain fine-grained, the toughness decreases and the amount of retained austenite increases, as a result of which dimensional stability decreases.

SUMMARY OF THE INVENTION

The object of the present invention is, without further alloying of the abovementioned steel comprising:

0.75–1.1% by weight of C;
up to 1.0% by weight of Si;
less than 0.015% by weight of P;
up to 0.5% by weight of Mo;
up to 1.2% by weight of Mn;
0.5–2% by weight of Cr;
the remainder being Fe, and at comparatively low cost, to change the structure of this universally used steel in such a way that better properties are obtained for these particular uses.

This object is achieved in a process described herein above by the steel being exposed, for from 1 to 10 hours, at a temperature between 780° and 900° C., to that atmosphere whose composition is such that the carbon activity ($a_c$) is between 0.90 and 1.10 and that a nitrogen potential $N_{pot}$ in balance with the atmosphere arises, measured directly on the surface, of 0.1–0.6% by weight of N. Such a nitrogen potential can be measured by means of foil analysis. By carbonitriding with such a high carbon activity, highly alloyed martensite is produced on the surface of the steel. As a result, the static capacity, toughness, fatigue strength for rolling contact and wear resistance are improved.

DESCRIPTION OF THE PREFERRED EMBODIMENT

This process for obtaining highly alloyed martensite differs from the processes known hitherto.

The thermal treatment according to the invention produces enrichment of the surface with carbon and nitrogen. No cementite is produced at or near the surface of the steel, as is normally observed in carbonitriding ball-bearing steel having the composition 1% by weight C-1.5% by weight Cr, Fe (SAE 52100). As a result of the process according to the invention, the grain size of the austenite remains small owing to precipitation and growth of fine residual carbides. As a result of the quenching after carbonitriding, a fine-grained martensite having high strength is produced. Since the surface is enriched with austenite-strengthening elements, the temperature at which the martensite is produced is lower at the surface during quenching than in the prior art. The surface enrichment causes the shear strength of the austenite to increase, so that larger undercooling is necessary, the temperature at which the martensite is produced consequently being lower. Moreover, the compressive stress at the surface becomes larger, as a result of which the stresses encountered in operation decrease and the service life is prolonged. This involves a conventional heat treatment. The lower martensite start temperature provides a considerable increase in retained austenite at the surface. This, however, takes place only near the surface, and consequently the dimensional stability does not suffer.

According to a preferred embodiment of the invention, the treatment temperature during carbonitriding is between 800° and 880° C., the duration of the treatment between 3 and 5 hours and the carbon activity is approximately 1.0.

In particular, the added carbonitriding atmosphere comprises 17–25% by volume of carbon monoxide, 30–45% by volume of hydrogen, 1–10% by volume of ammonia. The amount of ammonia used depends to a considerable extent on the furnace in which the carbonitriding is carried out, and on the other process parameters. During the disassociation of ammonia, atomic nitrogen is released which is partly incorporated into the metal. During carbonitriding, the amount of nitrogen released is measured by arranging metal foils in the furnace and analysing these at once.

A steel obtained by the process described hereinabove preferably comprises, near the surface, 10–30% by volume of austenite, 3–10% by volume of carbide, the remainder being martensite.

The invention will be clarified below in more detail with reference to an example. Steel 52100 with the following composition was used:

TABLE 1

| Chemical composition: | |
|---|---|
| Carbon: | 0.99% by weight |
| Silicon: | 0.24% by weight |
| Manganese: | 0.29% by weight |
| Phosphorus: | 0.018% by weight |
| Sulphur: | 0.023% by weight |
| Chromium: | 1.37% by weight |
| Nickel: | 0.19% by weight |
| Molybdenum: | 0.06% by weight |
| Copper: | 0.20% by weight |
| Aluminium: | 0.042% by weight |

Various samples from the abovementioned steel were subjected to a carbonitriding treatment under the following conditions.

TABLE 2

| Test | Temp (°C.) | Time (hr) | NH$_3$ (%) |
|---|---|---|---|
| 1 | 820 ± 10° C. | 4 | 3 |
| 2 | 870 ± 10° C. | 4 | 3 |
| 3 | 870 ± 10° C. | 4 | 1 |
| 4 | 900 ± 10° C. | 4 | 3 |

The carbon activity of the atmosphere was maintained at 1, as far as possible, which is to say that no soot was formed, just. The test samples were present in the form of ball-bearing rings and were all quenched in oil at 50° C. directly from the abovementioned carbonitriding temperature, were rinsed at 60° C. and tempered at 160° C. for 1.5 hours.

As indicated above, the atmosphere in the furnace depends on the type of furnace employed. When measured, said atmosphere was found to have the following composition:

TABLE 3

| Atmosphere | Test 1 | Test 2 | Test 3 | Test 4 |
|---|---|---|---|---|
| CO (% by volume) | 17.3 | 17.0 | 18.6 | 18.2 |
| H$_2$ (% by volume) | 41.0 | 42.0 | 42.0 | 42.0 |
| Oxygen sensor$_{2,3}$[1] (mV) | 1123 | 1147 | 1145 | 1162 |
| a$_c$ | 0.93 | 0.90 | 0.95 | 0.97 |
| Carbon potential[3,4] (% by weight) | 0.89 | 1.14 | 1.06 | 1.17 |

[1] The oxygen sensor employed was of the make Process Electronics, Model Carbodiff-CE with an oxygen-measuring cell type CS-85.
[2] The value for the carbon activity is given with respect to the activity for graphite, i.e. graphite used in the "standard state" for carbon.
[3] The carbon activity and the carbon potential are calculated from the gas composition and the value measured with the oxygen sensor.
[4] The carbon potential is a property of the atmosphere and corresponds, during carburization, to the carbon content of an iron foil. During carbonitriding, an interaction with nitrogen occurs, as a result of which the carbon content measured in the foil is lower than the theoretical carbon potential.

1) The oxygen sensor employed was of the make Process Electronics, Model Carbodiff-CE with an oxygen-measuring cell type CS-85.
2) The value for the carbon activity is given with respect to the activity for graphite, i.e. graphite used in the "standard state" for carbon.
3) The carbon activity and the carbon potential are calculated from the gas composition and the value measured with the oxygen sensor.
4) The carbon potential is a property of the atmosphere and corresponds, during carburization, to the carbon content of an iron foil. During carbonitriding, an interaction with nitrogen occurs, as a result of which the carbon content measured in the foil is lower than the theoretical carbon potential.

On comparing the tables 3 and 4, the relationship between the carbon potential and the value at the foil can be determined.

Sample 3 was carbonitrided under "leaner" conditions, as far as the amount of ammonia added is concerned. Sample 4 was used to determine the influence of the carbonitriding temperature.

The carbon and nitrogen contents were determined by introducing iron foil into the furnace at the same time as samples, and by analysing this immediately for carbon and nitrogen. The results thereof are presented in table 4.

TABLE 4

| Sample | Foil Analyses | |
|---|---|---|
|  | C (%) | N (%) |
| 1 | 0.79 | 0.46 |
|  | 0.79 | 0.49 |
| 2 | 0.95 | 0.28 |
|  | 0.95 | 0.26 |
| 3 | 0.95 | 0.15 |
|  | 0.97 | 0.14 |
| 4 | — | — |

It is found that raising the treatment temperature from 820° C. (test 1) to 870° C. (test 2) increases the carbon percentage and reduces the nitrogen percentage. At a constant treatment temperature of 870° C., a reduction of the ammonia fraction from 3% (test 2) to 1% (test 3) gave a decrease in the amount of nitrogen, but no effect on the amount of carbon taken up. After tempering, the samples were subjected to renewed hardening. After carbonitriding, either slow cooling or quenching in oil was carried out. In some cases, hardening was then repeated at 820°–850° C. for approximately 5–20 minutes. Quenching in oil or salt was then carried out at a temperature between 50° and 110° C., and tempering at 160° C.

Metallographic studies showed that the microstructure of the samples 1 and 2 obtained by the abovementioned method comprised a layer of martensite with a large percentage of retained austenite at the surface boundary. This layer was free of carbides. Directly below the interface there was a band of enlarged carbides, but the depth where this band was encountered varied to some extent. In the case of the ring according to test 1, the depth was 175 μm and in the case of the ring according to test 2, the depth was 150 μm, all measured in the race of the bearing. The amount of retained austenite in the matrix around the enlarged carbides was greater in the case of the rings according to test 2, and these carbides were likewise found to be larger. For both versions, the total affected depth was from 250 to 500 μm. When the core, the band containing enlarged carbide and the surface layer were tested, it was found that the core structure was not particularly coarse. The grain size of the austenite was 8 μm in the case of the ring according to test 1 and 10 μm in the case of test 2. The hardness at the interface was found to be lower than in the core. At a depth of 0.3 mm, the hardness HV was approximately 750 for both versions. In the core, the hardness HV was approximately 840 at a load of 0.5 kg. When loading with 10 kg, the Vickers hardness was found to be 820 for the ring according to test 1 and 840 for the ring according to test 2. The hardness was found to be lowest in the case of the ring according to test 2 and at from 0.09 to 0.17 mm from the surface.

The ring according to test 3 had a martensite layer with a considerable percentage of retained austenite at the interface and a band of large carbides at a depth of 100 μm. The hardness HV of the core was 806 (at a load of 10 kg) and the starting grain size of the austenite was 9 μm.

In the ring according to test 4, a large amount of retained austenite and of martensite was likewise present. The depth of the carbide-free layer was approximately 80 μm from the interface. In spite of the high treatment temperature, enlarged carbides were present in the matrix, although little residual carbides were found in the core. At a load of 10 kg the Vickers hardness was only 775, which is probably caused by the large amount of retained austenite.

It was found that after a grinding and/or honing treatment of the samples which were treated according to the present invention, the surface layer consisting of carbide-free martensite and residual austenite was completely removed. The new surface layer consisted of enlarged carbides, martensite and the residual austenite. The carbides, in particular, have a positive effect on the wear resistance.

Although the invention has been described hereinabove with reference to a few examples, it should be understood that the invention is not limited thereto and that the scope extends to what is defined in the accompanying claims.

We claim:

1. A process for carbonitriding a steel comprising:

0.75–1.1% by weight of C;

up to 1.0% by weight of Si;

less than 0.015% by weight of P;

up to 0.5% by weight of Mo;

up to 1.2% by weight of Mn;

0.5–2% by weight of Cr;

the remainder being Fe, by exposing it to an atmosphere comprising

17–25% by volume of carbon monoxide,

30–45% by volume of hydrogen,

1–10% by volume of ammonia, for from 1 to 10 hours, at a temperature between 780° and 900° C., wherein the composition of the atmosphere is such that the carbon activity (%) is between 0.90 and 1.10 and that a nitrogen potential $N_{pot}$ in balance with the atmosphere results, measured directly on the surface, of 0.1–0.6% by weight of N.

2. Process according to claim 1, in which the nitrogen potential, measured at the surface, is approximately 0.4% by weight of N.

3. Process according to claim 1, in which the treatment temperature is between 800° and 870° C., the duration of the treatment between three and five hours, and the carbon activity ($a_c$) is approximately 1.00.

4. Process according to claim 1, in which the steel comprises:

0.85–0.95% by weight of C up to 0.1% by weight of Si 0.2–0.3% by weight of Mo 0.25–0.45 by weight of Mn 1.30–1.65 by weight of Cr.

5. Process according to claim 1 in which the steel is quenched after carbonitriding.

6. Steel produced according to the process of claim 1, wherein said steel comprises:

0.75–1.1% by weight of C;

up to 1.0% by weight of Si;

less than 0.015% by weight of P;

up to 0.5% by weight of Mo;

up to 1.2% by weight of Mn;

0.5–2% by weight of Cr;

the remainder being Fe, and near the surface 10–30% by volume of retained austenite, 3–10% by volume of carbides, the remainder being martensite.

7. Rolling bearing, comprising at least one part of a steel produced according to the process of claim 1, wherein said steel comprises:

0.75–1.1% by weight of C;

up to 1.0% by weight of Si;

less than 0.015% by weight of P;

up to 0.5% by weight of Mo;

up to 1.2% by weight of Mn;

0.5–2% by weight of Cr;

the remainder being Fe, and near the surface 10–30% by volume of retained austenite, 3–10% by volume of carbides, the remainder being martensite.

* * * * *